United States Patent [19]

Wingard, Jr. et al.

[11] 4,255,548
[45] Mar. 10, 1981

[54] ETHYLENE-VINYLAMINE COPOLYMERS

[75] Inventors: Robert E. Wingard, Jr., Palo Alto; Eric R. Larson, Concord, both of Calif.

[73] Assignee: Dynapol, Palo Alto, Calif.

[21] Appl. No.: 110,071

[22] Filed: Jan. 7, 1980

[51] Int. Cl.³ .......................................... C08F 226/02
[52] U.S. Cl. .................................. 526/310; 525/336; 526/303; 564/512
[58] Field of Search ........................ 526/310; 525/336

[56] References Cited

U.S. PATENT DOCUMENTS 4,018,826  4/1977  Gless et al. ........................ 526/310

Primary Examiner—Stanford M. Levin
Attorney, Agent, or Firm—William H. Benz

[57] ABSTRACT

Copolymers of ethylene and vinylamine are disclosed as are methods for their production. The disclosed copolymers find application primarily as flocculants.

3 Claims, No Drawings

ETHYLENE-VINYLAMINE COPOLYMERS

BACKGROUND OF THE INVENTION

1. Field of the Invention

This invention concerns synthetic nitrogen-containing organic polymers, more particularly random copolymers of ethylene and vinylamine.

2. The Prior Art

Gless et al., in U.S. Pat. No. 4,018,826 and J. Am. Chem. Soc., 98, 5996 (1976), report the preparation of vinylacetamide, its polymerization to poly(vinylacetamide), and subsequent conversion to homopolymeric poly(vinylamine). Wingard et al., in U.S. patent application Ser. No. 040,359, disclose copolymers of styrene with vinylacetamide and vinylamine, while Bayer's British Pat. No. 1,158,539 (1969) shows vinylamide polymers including copolymers of vinylacetamide and vinylformamide with ethylene. There appear to be no teachings of a copolymer of ethylene with vinylamine.

STATEMENT OF THE INVENTION

It has now been discovered that copolymers of ethylene and vinylamine can be prepared and that these materials, especially at ethylene:vinylamine molar ratios of at least 1:1, offer advantageous properties as flocculants for water clarification. The copolymers may be prepared by the process of copolymerizing vinylacetamide or vinylformamide with ehtylene and thereafter hydrolyzing the amide units to the desired amines.

DETAILED DESCRIPTION OF THE INVENTION

The copolymers of this invention comprise two randomly repeating units—ethylene and vinylamine. The vinylamine may be present as such and as an acid addition salt in varying equilibrium proportions depending upon the pH at which the copolymer is held. At neutral to basic pH's, the vinylamine units are predominantly present as

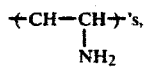

while at acidic pH's, especially at strongly acidic pH's, the vinylamine units tend to be present as acid addition salts such as the hydrochloride,

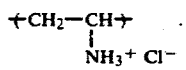

It is to be understood that both of these forms and the equilibrium between them are intended by the term "vinylamine."

The molar ratio of ethylene to vinylamine units may be varied. Generally, it is desired to have an ehtylene to vinylamine ratio of 1:1 or greater, preferably from 1:1 to 10:1, more preferably 1.5:1 to 6:1 and most preferably from 2:1 to 4:1. Within these ranges the desired unique physical and chemical properties imparted by the amine units are preserved, while the cost of the polymers is markedly lowered by the presence of the more economical ethylene units.

The copolymers can be formed in any average molecular weight from as low as $1 \times 10^3$ daltons to as much as $1 \times 10^8$ daltons or greater. Copolymers are generally preferred which have molecular weights of from about $5 \times 10^4$ to about $5 \times 10^6$. Whenever a molecular weight is given, it is a molecular weight determined for the copolymeric amide form by gel permeation chromatography techniques with poly(vinylacetamide) standards.

The vinylamine final copolymer products of this invention may be depicted structurally as follows:

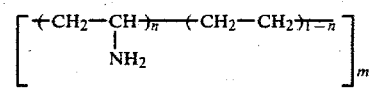

wherein n is a number having a value of from about 0.5 to about 0.09, preferably 0.4 to 0.14 and most preferably 0.33 to 0.20, and m is an integer greater than 10 and preferably ranging from about $7 \times 10^2$ to about $7 \times 10^4$.

The copolymers may be formed by the following representative process.

Vinylacetamide may be prepared by the method of Gless et al., U.S. Pat. No. 4,018,826, wherein it is taught that acetamide and acetaldehyde are condensed to yield ethylidene bisacetamide which is thereafter pyrolyzed to yield vinylacetamide as a component of a crude pyrolyzate. The vinylacetamide is generally purified by extraction. Purified vinylacetamide is contacted with ethylene in the desired molar ratio, and a polymerization initiator usually of the free-radical type such as AIBN. AIBN is the abbreviation for 2,2'-azobisisobutyronitrile, a material sold by DuPont under the trade name VAZO 64. Amounts of from 0.5 to about 5 mol % basis vinylamide units are generally found useful. A solvent, usually one or more of the lower alkanols such as methanol, ethanol, the propanols or the butanols, is generally present. The concentration of vinylacetamide in the reaction solvent is from about 3 to 25% by weight, especially about 7 1/2 to 20% by weight. The mixture is stirred at moderate temperatures such as 40° to 100° C. (preferably 50° to 90° C.). Higher or lower temperatures could be employed if desired and are not seen as leading to a markedly different product. The reaction time is long. At 65° C., 10 hours is generally regarded as a minimum with about 50 hours assuring complete reaction. At higher temperatures, shorter times, such as 1-2 hours, would be useful so that the overall time range would be about 1 to 50 hours. This step yields an ethylene:vinylacetamide intermediate which, after optional recovery, is next converted to the desired ethylene-vinylamine product by hydrolysis.

This hydrolysis may be carried out by intimately contacting the copolymer intermediate with a molar excess of aqueous mineral acid such as HCl, HBr, HI, $H_2SO_4$, or the like, at elevated temperatures. The amounts of acid employed generally range from 1.5 to 5 moles of acid per mole of amide to be hydrolyzed with amounts of 2 to 4 moles of acid per mole of amide being preferred. This hydrolysis is carried out at a temperature of at least about 75° C.; lower temperatures would work, but would take extremely long times. Temperatures of from about 90° to about 200° C. are preferred with temperatures of 100° to 175° C. being more preferred. The times required to effect hydrolysis range from about 100 hours at the lower temperatures to about one hour at the higher temperatures; in the more preferred temperature ranges times from about 2 to about 50 hours are generally employed.

Following hydrolysis the ethylene:vinylamine copolymer is in the form of the acid addition salt corresponding to the acid used in hydrolysis. This can be converted to the free amine form by neutralizing to pH 7 or so with base. The acid addition salt or free amine form can be recovered and purified by any one of the standard techniques for separating water-soluble polymeric substances from low molecular weight contaminants and particulates. These techniques include ultrafiltration and precipitation into a nonsolvent such as iso-propyl alcohol. These postreaction steps may also include optional solvent removal steps such as stripping, lyophilization, spray drying, tray drying, drum drying, or the like. This is one of several possible processes for forming the subject copolymer. As will be shown in the examples, other methods may be used as well.

The products of this invention find use as backbones for polymeric colorants in reactions analagous to those disclosed in *J. Am Chem. Soc.*, 98, 5996 (1976) and *Macromolecules*, 11, 320 (1978), and as flocculants for suspended solids in aqueous streams, where they are added to such aqueous streams in dosages of from about 5.0 to 500 ppm to cause suspended solids (dirt, coal dust, silica, or the like) to flocculate and drop out of suspension.

The invention will be further described by the following examples. These are furnished for purposes of illustration and are not to be construed as limiting the invention's scope which is instead defined by the appended claims.

EXAMPLE I

A 3:1 ethylene:vinylamine copolymer was prepared as follows.

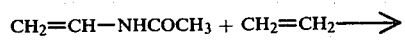

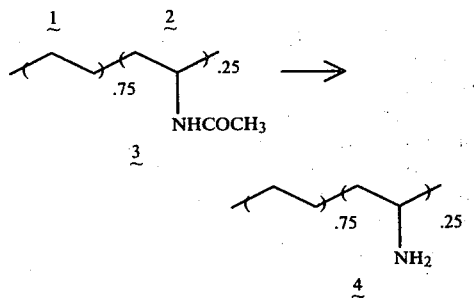

The vinylacetamide (1) employed in this example was prepared by the pyrolysis of ethylidene bisacetamide, as set forth in *J. Am. Chem. Soc.*, 98, 5996 (1976).

Purification of (1). A 3144 g (3000 ml) sample of aqueous 1, containing 743 g (8.74 mol) of this monomer by GC assay, was diluted with 3000 ml of distilled $H_2O$ and divided into three equal portions. Each 2000-ml portion was extracted with ether (9×1000 ml). The extracts were combined, and 3000-ml portions thereof were washed with $H_2O$ (100 ml), brine (250 ml), and dried ($Na_2SO_4$ and then $MgSO_4$). The dried portions were combined and the solvent removed by rotary evaporation. Benzene was employed to azeotrope traces of residual $H_2O$. After final drying (25° C., 0.1 mm, 8 hours), there was obtained 477 g (5.62 mol, 64.3% recovery) of 1 as a white solid.

Each of the 2000-ml aqueous portions were saturated with NaCl (400 g each) and extracted with ether (3×1000 ml). The ethereal extracts were treated as before to provide an additional 137 g (1.61 mol, 18.4% recovery) of 1. Total recovery was 614 g (7.22 mol, 82.6%).

3:1 Ethylene-Vinylacetamide Copolymerization. Vinylacetamide (75.0 g, 0.882 mol), AIBN (3.62 g, 22.1 mmol), and 675 ml of tert-butyl alcohol were placed in a 1-liter stirred autoclave. The system was purged with $C_2H_4$ (2), sealed, and pressurized to 500 psi with this gas. Heating (65° C. internal temp) and stirring (550 rpm) were conducted for 48 hours with the $C_2H_4$ tank open to the system at all times.

The contents of the bomb were removed and it was flushed with 750 ml $CH_3OH$. The product was placed in a 2-liter, one-neck flask and subjected to exhaustive rotary evaporation (30°–50° C., water aspirator, 8 hours), followed by oven drying (50° C., 0.1 mm, 14 hours). This produced 142.8 g of poly(ethylene-co-acetamidoethylene) (3) as a slightly off-white brittle solid. The weight yield (67.8 g of $C_2H_4$ incorporated) suggested a mer composition of 73% $C_2H_4$:27% vinylacetamide.

A small sample of 3 was ground up, further dried (50° C., 0.1 mm, 24 hours), and subjected to elemental analysis. Results (C, 55.741 mequiv/g; N, 6.604 mequiv/g) indicated a mer composition of 69% $C_2H_4$:31% vinylacetamide. The molecular weight of 3 was determined to be $1.3 \times 10^6$ by gel permeation chromatography techniques.

Hydrolysis. The 142.8 g of 3, contained in a 2-liter, one-neck flask, was treated with 184 ml (2.21 mol) of 12 N HCl and 1066 ml of $H_2O$. After standing at room temp for 48 hours, the reaction vessel was rigged for reflux and overhead stirring, and heated in a bath maintained at 110° C. At reaction times of 24 and 48 hours, the bath temp was sequentially raised to 115° and 120° C.

After 72 hours, the reaction mixture was cooled, diluted with 2 liters of $H_2O$, and transferred to a 5-liter, three-neck flask equipped with overhead stirrer, pH probe, and 500-ml dropping funnel. The polymer solution was neutralized to pH 7.5 by the dropwise addition of 325 ml (2.60 mol) of 8 N NaOH. The solution was filtered with an H1P10 cartridge (mol wt cutoff $1 \times 10^4$) obtained from Amicon Corporation (Lexington, Mass.) for 5×4-liter diavolumes with distilled $H_2O$, and concentrated to a weight of 2468.0 g. Lyophilization of an aliquot showed the solution to be 4.63 wt % polymer and indicated the weight yield to be 114.20 g.

The freeze-dried aliquot of poly(ethylene-co-aminoethylene) (4) was dried (50° C., 0.1 mm, 24 hours) and subjected to elemental analysis and amine titration. Results (C, 49.729 mequiv/g; N, 7.196 mequiv/g; Cl, 3.703 mequiv/g; amine titration, 7.06 mequiv/g) indicated essentially complete hydrolysis and a mer composition of 71% $C_2H_4$:29% vinylamine. These results also showed 52% (15 mer %) of the amino groups to be in the hydrochloride form, and the overall yield, based upon 1, to be 93.2%.

EXAMPLES II-V

The experiment of Example I was repeated four times under the conditions and with the result set forth in Table I. In Table I the results of copolymerization are given. Column A gives the pressure of ethylene employed, Column B the solvent used, C the concentration of initiator, D the reaction time, E the reaction temperature, and F the product composition expressed as mer % C₂H₄/mer % vinylacetamide determined in the product by elemental analysis. In Table II the results of the hydrolyses of these same preparations are given. It will be appreciated by those skilled in the art that other changes could be made in these experiments without departing from the spirit of the invention. For example, the ratio of vinylacetamide and ethylene could be varied by raising or lowering the ethylene pressure and vinylacetamide concentration. Other solvents could be substituted, the reaction time and temperature could be varied and different initiators could be used.

EXAMPLE VI a 1:1 ethylene-vinylamine copolymer was prepared as follows.

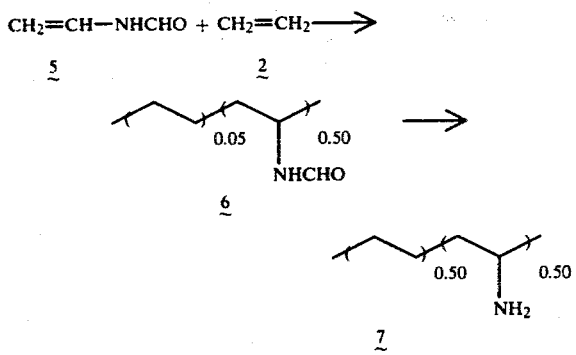

The vinylformamide (5) employed in this example was obtained from α-formamidopropionitrile [F. Becke and P. Paessler, *Justus Liebigs Ann. Chem.*, 735, 27 (1970); U.S. Patent 3,822,306 (1974)] by gas-phase pyrolysis [P. Kurtz and H. Disselnkötter, *Justus Liebigs Ann. Chem.*, 764, 69 (1972), U.S. Pat. No. 3,424,791 (1969)]. The monomer was distilled before use (bp 39° C./0.05 mm).

1:1 Ethylene-Vinylformamide Copolymerization. Vinylformamide (50.0 g, 0.704 mol), AIBN (2.89 g, 17.6 mmol), and 500 ml of tert-butyl alcohol were placed in a one-liter stirred autoclave. The system was purged with C₂H₄, sealed, and pressurized to 300 psi with this gas. Heating (65° C. internal temp) and stirring (550 rpm) were conducted for 48 hours with the C₂H₄ tank open to the system at all times.

The contents of the bomb were removed and it was flushed with 500 ml of CH₃OH. The product was placed in a 2-liter, one-neck flask and subjected to exhaustive rotary evaporation (40° C., water aspirator, 6 hours), followed by oven drying (50° C., 0.1 mm, 16 hours). This produced 68.20 g of poly(ethylene-co-formamidoethylene) (6) as a light-tan brittle solid. The weight yield (18.20 g of C₂H₄ incorporated) suggested a mer composition of 48% C₂H₄:52% vinylformamide.

A small sample of 6 was ground up, further dried (50° C., 0.1 mm, 18 hours), and subjected to elemental analysis. Results (C, 50.203 mequiv/g; N, 10.203 mequiv/g) indicated a mer composition of 49% C₂H₄:51% vinylformamide.

The molecular weight of 5 was determined to be $9.6 \times 10^5$ by gel permeation chromatography techniques.

Hydrolysis. The 68.20 g of copolymeric amide, contained in a two-liter one-neck flask, was treated with 147 ml (1.76 mol) of 12 N HCl and 439 ml of H₂O. The reaction vessel was rigged for reflux and overhead stirring, and heated in a bath maintained at 120° C. for 48 hours.

The mixture was cooled, diluted with 2.5 liters of H₂O, and transferred to a 5-liter, three-neck flask equipped wiith overhead stirrer, pH probe, and 500-ml dropping funnel. The polymer solution was then neutralized to pH 7.6 by the dropwise addition of 259 ml (2.07 mol) of 8 N NaOH. The solution was filtered (Whatman GFA followed by 10-μ polycarbonate), ultrafiltered (H1P10, 5×4-liter diavolumes with distilled H₂O), and concentrated to a weight of 1729.0 g. Lyophilization of an aliquot showed the solution to be 4.36 wt % polymer, and indicated the weight yield to be 53.68 g.

The freeze-dried aliquot of 7 was dried (50° C., 0.1 mm, 24 hours) and subjected to elemental analysis and amine titration. Results (C, 42.852 mequiv/g; N, 10.238 mequiv/g; Cl, 4.708 mequiv/g; amine titration, 10.50 mequiv/g) indicated essentially complete hydrolysis and a mer composition of 52% C₂H₄:48% vinylamine. These results also showed 46% (22 mer %) of the amino groups to be in the hydrochloride form, and the overall yield, based upon vinylformamide, to be 84.6%

TABLE I
PREPARATION OF ETHYLENE-VINYLACETAMIDE COPOLYMERS

| EXAMPLE NUMBER[a] | A C₂H₄ PRESS (psi) | B SOLV | C INIT (mol %)[b] | D TIME (h) | E TEMP. (°C.)[c] | F ANAL COMP[d] |
|---|---|---|---|---|---|---|
| 2 | 500 | t-BuOH | 2.0 | 48 | 65 | 74/26 |
| 3 | 500 | t-BuOH | 2.5 | 24 | 65 | 58/42 |
| 4 | 500 | CH₃OH | 2.0 | 48 | 65 | 58/42 |
| 5 | 750 | CH₃OH | 2.5 | 48 | 65 | 73/27 |

[a]Example 4 was conducted with 50.0 g (0.588 mol) of 1, while the remainder were conducted with 75.0 g (0.882 mol).
[b]AIBN relative to 1.
[c]Thermocouple-monitored internal temp.
[d]Mer % C₂H₄/mer % 1 by elemental analysis.

TABLE II
HYDROLYSES[a]

| EXAMPLE NUMBER[a] | A CONC (%)[b] | B REFLUX TIME(h) | C PRODUCT FORM[c] | D AMINE CONTENT (mequiv/g)[d] | E PERCENT HYDROL[e] | F AMINE . HCl (%)[f] | G ANAL COMP[g] | H PRODUCT WEIGHT |
|---|---|---|---|---|---|---|---|---|
| 2 | 10 | 64 | solid | 6.70 | 104 | — | 74/26 | 107.4 |
| 3 | 10 | 72 | soln | 0.36 | 99 | 67 | 64/36 | 100.2 |
| 4 | 10 | 48 | solid | 8.75 | 104 | 53 | 64/36 | 50.5 |

TABLE II-continued

| | A | B | C | HYDROLYSES[a] D AMINE | E | F | G | H |
|---|---|---|---|---|---|---|---|---|
| EXAMPLE NUMBER[a] | CONC (%)[b] | REFLUX TIME(h) | PRODUCT FORM[c] | CONTENT (mequiv/g)[d] | PERCENT HYDROL[e] | AMINE . HCl (%)[f] | ANAL COMP[g] | PRODUCT WEIGHT |
| 5 | 10 | 72 | soln | 0.40 | 97 | 65 | 73/27 | 105.8 |

[a] Conducted at reflux with 2.50 equiv HCl.
[b] Initial wt % copolymer in hydrolysis mixture.
[c] Soln preparations were ~ 5 wt % polymer in pH 7 $H_2O$.
[d] Determined by titration of the product in its final form.
[e] Amine content (titration) divided by total nitrogen content (elem anal).
[f] Chlorine content (elem anal) divided by nitrogen content (elem anal).
[g] Mer % $C_2H_4$/mer % vinylamine (elem anal).

What is claimed is:

1. A random copolymer consisting essentially of ethylene and vinylamine repeating units.

2. The copolymer of claim 1 wherein the mole ratio of ethylene units to vinylamine units is 1:1 to 10:1.

3. The copolymer of claim 2 having an average molecular weight of from $1 \times 10^3$ daltons to $1 \times 10^8$ daltons.